UNITED STATES PATENT OFFICE.

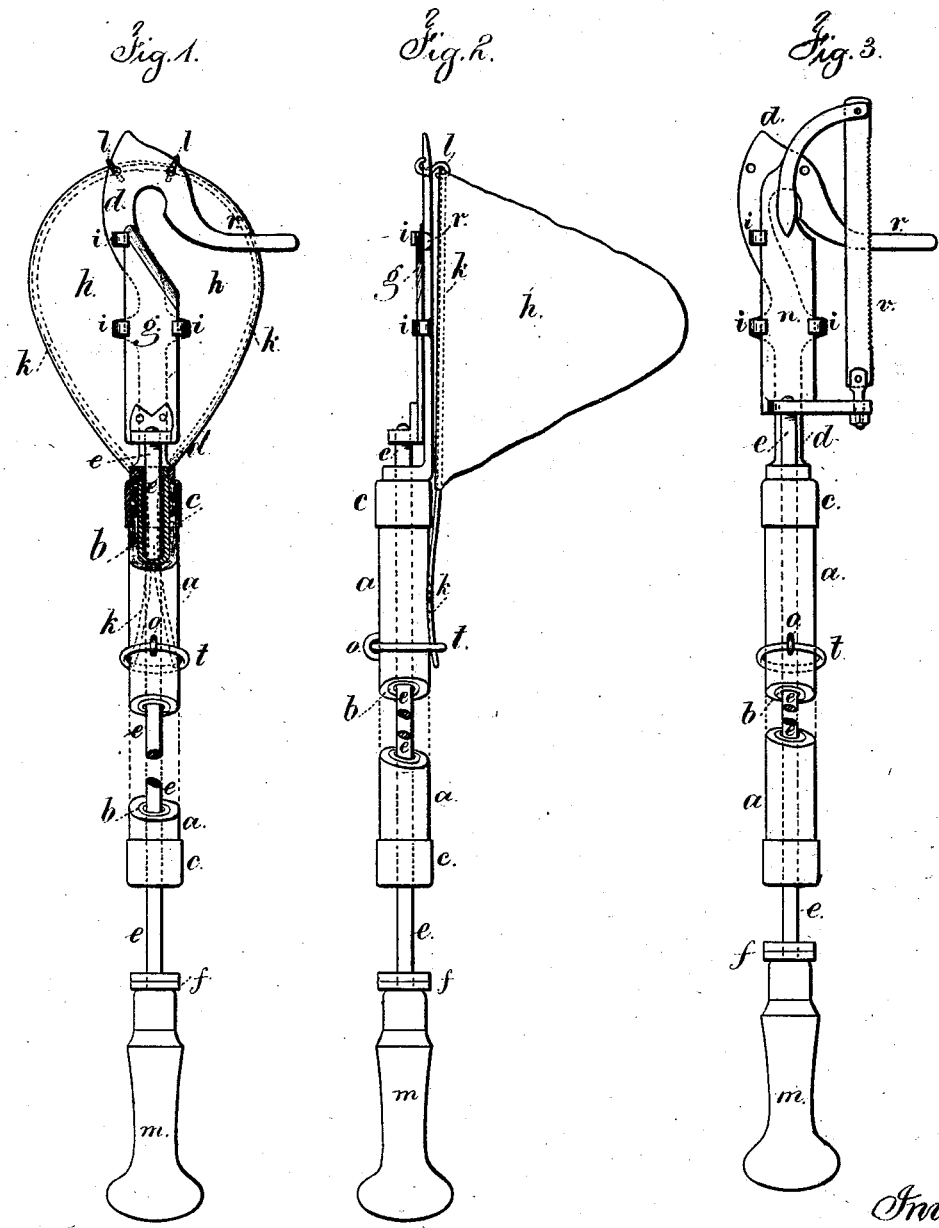

ALEXANDER L. BEVANS, OF FLUSHING, NEW YORK.

IMPROVEMENT IN PRUNER AND FRUIT-PICKER.

Specification forming part of Letters Patent No. 190,267, dated May 1, 1877; application filed March 15, 1877.

*To all whom it may concern:*

Be it known that I, ALEXANDER L. BEVANS, of Flushing, in the county of Queens and State of New York, have invented an Improvement in Pruners and Fruit-Pickers, of which the following is a specification:

Pruning-instruments have been placed upon a pole and operated both by cords and levers. Difficulty arises in many cases from the cutter crushing and bruising the wood, loosening the bark, and causing the end of the limb to die, instead of making a clean shearing cut that rapidly heals.

I make use of a hollow pole with a stock upon the end, which stock is hooked to catch upon the stem or branch to be cut, and there are guide-lips upon the stock, by means of which a diagonal cutter is retained in place. This is removably connected to its operating rod, so that the cutter can be taken out and a saw inserted upon a plate corresponding in size to the cutter, so as to be held and guided in the same lips.

I also construct a bag in such a manner that it can be removably connected to the picker to catch the fruit that may be cut off.

In the drawing, Figure 1 is a side view of the two ends of the implement. Fig. 2 is an edge view of the cutter with the bag attached; and Fig. 3 represents the implement with the saw attached.

The pole or handle $a$ may be of any desired length, made of wood or metal; but a bamboo is preferable. There is a longitudinal hole running all through the pole $a$, and the iron pipe $b$ extends partially or entirely through the same. It is generally only required at the respective ends, and secured by transverse pins, and the ferrules $c$ serve to strengthen the wood.

At the outer end of the pole or handle $a$ the pipe $b$ is provided with a screw-thread, so that the stock $d$ can be firmly secured at the end of the pole; but it can be removed when required.

The longitudinal rod $e$ runs through the pipe $b$, and it has a handle or ball, $m$, at the lower end, by which the operator moves the rod endwise. The leather or elastic washers $f$ serve to lessen concussion and noise.

The stock $d$ is made with a hook, $r$, to catch the limb or twig to be cut, and a throat or recess into which the same passes while being operated upon by the sliding cutter $g$, which has a diagonal cutting-edge at the end. It is screwed upon the rod $e$, and it is guided by the lips $i\ i\ i$ upon the stock, and between which the cutter is moved endwise by the rod $e$ and handle $m$, when acting to sever a branch twig or stem.

In all cases the cut is shearing, so as not to bruise or crush the wood, and hence the limb will heal and not die down, as is frequently the case where the wood is cracked and bruised.

Furthermore, the cutter is easily taken out endwise by unscrewing the rod $e$, so as to be sharpened whenever it becomes dull.

This same implement is available as a fruit-picker by adding the bag $h$ that is upon the wire bow $k$, and hooked to the stock $d$ by the hooks at $l$, and held at the other end by the ring $t$ receiving the spring ends of the bow $k$. This ring $t$ is held in place by the staple $o$; but it can be swung back and forth sufficient to hold or liberate the spring ends of the bow, which ends diverge so as to catch the ring by expanding after they have been compressed and inserted into the ring.

The bag $h$ is shown in both Figs. 1 and 2; but it is to be removed when the instrument is used for pruning.

In order to employ a saw in this instrument the rod $e$ is to be unscrewed from the cutter $g$ and the latter removed, and in its place the plate $n$ is introduced, and upon the same is the bow or frame for the saw $v$, and there is a socket or nut into which the rod $e$ screws; hence this saw can be moved back and forth in the same way as the chisel, to saw any limb with which it is brought into contact, and at the same time the hook $r$ of the stock serves to steady the limb and hold it against the action of the saw.

I claim as my invention—

1. The stock $d$, provided with the hook $r$ and guide-lips $i\ i$, in combination with the plate $n$, saw $v$, rod $e$, and pole $a$, substantially as set forth.

2. The stock $d$, hook $r$, lips $i\ i$, handle $a$, and screw-rod $e$, constructed substantially as set forth, so as to be adapted to receiving either the sliding cutter $g$, or the sliding plate $u$, of the saw $v$, substantially as set forth.

3. In the pruning instrument, the holes in the stock for the hooks $l$ of the removable bag, and the ring $t$ upon the handle $a$ for the wire-bow $k$, substantially as and for the purposes set forth.

Signed by me this 12th day of March, A. D. 1877.

A. L. BEVANS.

Witnesses:
 GEO. T. PINCKNEY,
 CHAS. H. SMITH.